US011357055B2

(12) United States Patent
Lin et al.

(10) Patent No.: US 11,357,055 B2
(45) Date of Patent: Jun. 7, 2022

(54) NPRACH FORMATS FOR NB-IOT TRANSMISSION IN TDD MODE

(71) Applicant: Telefonaktiebolaget LM Ericsson (publ), Stockholm (SE)

(72) Inventors: Xingqin Lin, Santa Clara, CA (US); Johan Mikael Bergman, Stockholm (SE); Andreas Höglund, Solna (SE); Gerardo Agni Medina Acosta, Märsta (SE); Hazhir Shokri Razaghi, Solna (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 16/651,385

(22) PCT Filed: Sep. 26, 2018

(86) PCT No.: PCT/SE2018/050980
§ 371 (c)(1),
(2) Date: Mar. 27, 2020

(87) PCT Pub. No.: WO2019/066705
PCT Pub. Date: Apr. 4, 2019

(65) Prior Publication Data

US 2020/0245365 A1 Jul. 30, 2020

Related U.S. Application Data

(60) Provisional application No. 62/564,542, filed on Sep. 28, 2017.

(51) Int. Cl.
*H04W 74/08* (2009.01)
*H04L 5/14* (2006.01)

(52) U.S. Cl.
CPC .......... *H04W 74/0833* (2013.01); *H04L 5/14* (2013.01)

(58) Field of Classification Search
None
See application file for complete search history.

(56) References Cited

U.S. PATENT DOCUMENTS 8,553,590 B2 * 10/2013 Baldemair ........ H04W 74/0833 370/280
8,958,342 B2 * 2/2015 Dinan ................ H04L 61/6022 370/254

(Continued)

FOREIGN PATENT DOCUMENTS

CN 101488935 A 7/2009
CN 106982110 A 7/2017

(Continued)

OTHER PUBLICATIONS

ZTE, Considerations on uplink aspects to support TDD NB-IoT, 3GPP TSG RAN WG1 Meeting #90,Aug. 21-25, 2017, pp. 1-5, Prague, Czechia, R1-1713012.

(Continued)

*Primary Examiner* — Ayaz R Sheikh
*Assistant Examiner* — Faiyazkhan Ghafoerkhan
(74) *Attorney, Agent, or Firm* — Coats & Bennett, PLLC

(57) ABSTRACT

Random Access (RA) formats are defined for NB-IoT operation in TDD mode. The formats are defined to allow use of the legacy LTE subframe configurations for TDD. The formats specify a predetermined, even number P of symbol groups composing a RA preamble, wherein each symbol group comprises a Cyclic Prefix (CP) and a number X of symbols. The P symbol groups are divided into symbol group sets fitting into 1, or 2, or 3 contiguous uplink subframes, each comprising at least two symbol groups transmitted back-to-back (i.e., contiguously in time), and at (Continued)

100

SELECT A RA PREAMBLE FORMAT SPECIFYING A PREDETERMINED, EVEN NUMBER P OF SYMBOL GROUPS, WHEREIN EACH SYMBOL GROUP COMPRISES A CYCLIC PREFIX (CP) AND A NUMBER X OF SYMBOLS, WHEREIN THE SYMBOL GROUPS ARE DIVIDED INTO SYMBOL GROUP SETS, EACH COMPRISING AT LEAST TWO SYMBOL GROUPS TRANSMITTED CONTIGUOUSLY IN TIME, AND WHEREIN AT LEAST TWO SYMBOL GROUP SETS ARE TRANSMITTED NON-CONTIGUOUSLY IN TIME IN THE RA PREAMBLE
102 least two symbol group sets are transmitted non-contiguously in time across a number of uplink subframes over which the RA preamble is transmitted. The number of symbol groups in a set can be two or three, and the number of symbol groups is four or six, respectively. Symbol groups within a set are transmitted on adjacent uplink subframes. Five format options are defined, which map to various of the LTE TDD configurations.

16 Claims, 12 Drawing Sheets

(56) References Cited

U.S. PATENT DOCUMENTS 9,210,665 B2* 12/2015 Dinan ................... H04L 1/1835
10,389,496 B2* 8/2019 Hwang ............. H04W 72/0453
10,778,383 B2* 9/2020 Hwang ................. H04L 5/0007
10,813,140 B2* 10/2020 Shin .................... H04W 74/006
10,868,658 B2* 12/2020 Yi ..................... H04W 72/0446
10,917,825 B2 2/2021 Peisa et al.
11,116,005 B2* 9/2021 Shin ...................... H04L 5/0053
2013/0201885 A1* 8/2013 Yang ................... H04W 72/082 370/280
2013/0272230 A1* 10/2013 Dinan .................. H04B 7/2618 370/329
2014/0328227 A1* 11/2014 Wang ...................... H04L 69/22 370/280
2015/0139162 A1* 5/2015 Dinan ...................... H04J 11/00 370/329
2015/0373675 A1* 12/2015 Seo ....................... H04W 72/14 370/280
2016/0113037 A1* 4/2016 Mizusawa ................. H04L 5/14 370/280
2016/0149660 A1* 5/2016 Seo ................... H04W 72/0413 370/336
2017/0237546 A1* 8/2017 Yang ..................... H04L 1/1812 370/280
2018/0145802 A1* 5/2018 Hwang ............. H04W 72/0453
2018/0248671 A1* 8/2018 Bhattad ................. H04L 5/0055
2018/0248672 A1* 8/2018 Bhattad ................. H04L 5/0012
2018/0248673 A1* 8/2018 Bhattad ..................... H04L 5/26
2018/0248674 A1* 8/2018 Bhattad ................. H04L 5/0053
2018/0279363 A1* 9/2018 Su ....................... H04L 27/2602
2019/0044690 A1* 2/2019 Yi ..................... H04W 72/0446
2019/0098659 A1* 3/2019 Reddy ............... H04W 74/0833
2019/0159248 A1* 5/2019 Shin .................... H04L 27/2607
2019/0281624 A1* 9/2019 Kim .................... H04W 74/002
2019/0327039 A1* 10/2019 Hwang ................. H04W 72/04
2019/0349985 A1* 11/2019 Lin ...................... H04B 1/7143
2020/0053785 A1* 2/2020 Kim ....................... H04L 27/26
2020/0178296 A1* 6/2020 Shin ........................ H04L 5/001
2020/0236524 A1* 7/2020 Ye ......................... H04L 5/0094
2020/0305190 A1* 9/2020 Su ............................. H04L 1/18
2021/0144753 A1* 5/2021 Lin ..................... H04L 27/2613

FOREIGN PATENT DOCUMENTS

| | | | |
|---|---|---|---|
| RU | 2617834 | C2 | 4/2017 |
| WO | 2010087896 | A1 | 8/2010 |
| WO | 2013107304 | A1 | 7/2013 |
| WO | 2013116762 | A1 | 8/2013 |
| WO | 2014107063 | A1 | 7/2014 |
| WO | 2014110764 | A1 | 7/2014 |
| WO | 2014112905 | A1 | 7/2014 |
| WO | 2016036100 | A1 | 3/2016 |
| WO | 2016045715 | A1 | 3/2016 |
| WO | 2017130771 | A1 | 8/2017 |

OTHER PUBLICATIONS

Intel Corporation, "Design of NPRACH for TDD support in feNB-IoT", 3GPP TSG RAN WG1 Meeting #90, Aug. 21-25, 2017, pp. 1-3, R1-1714122.

Samsung, "WF on NPRACH for NB-IoT TDD", 3GPP TSG RAN WG1 Meeting #90, Aug. 21-25, 2017, pp. 1-2, R1-1714753.

Huawei et al., "Revised WID on Further NB-IoT enhancements", 3GPP TSG RAN Meeting #76, Jun. 5-8, 2017, pp. 1-5, West Palm Beach, US, RP-171428.

Ericsson et al., "New WID Even further enhanced MTC for LTE", 3GPP TSG RAN Meeting #75, Mar. 6-9, 2017, pp. 1-4, RP-170732.

MCC Support, "Draft Report of 3GPP TSG RAN WG1 #90 v0.1.0", 3GPP TSG RAN WG1 Meeting #90bis, Oct. 9-13, 2017, Prague, Czech Rep., R1-171xxxx.

Huawei et al., "Revised WID on Further NB-IoT enhancements", 3GPP TSG RAN Meeting #77, Sep. 11-14, 2017, pp. 1-6, RP-172063.

3rd Generation Partnership Project, "Technical Specification Group Radio Access Network; Evolved Universal Terrestrial Radio Access (E-UTRA); Physical channels and modulation (Release 14)", 3GPP TS 36.211 V14.2.0, Mar. 2017, pp. 1-194.

Ericsson, "UL aspects of TDD for NB-IoT", 3GPP TSG-RAN WG1 Meeting #93, Feb. 21-May 25, 2018, pp. 1-9, Busan, Korea, R1-1805863.

Qualcomm Incorporated, "Uplink aspects of TDD", 3GPP TSG-RAN WG1 #92, Feb. 26-Mar. 2, 2018, pp. 1-6, Athens, Greece, R1-1802344.

LG Electronics, "Discussion on UL aspects in TDD NB-IoT", 3GPP TSG RAN WG1 Meeting #92bis, Apr. 16-20, 2018, pp. 1-16, Sanya, China, R1-1804529.

NTT Docomo, Inc., "Study on New Radio Access Technology", 3GPP TSG RAN meeting #75, Mar. 6-9, 2017, pp. 1-157, Dubrovnik, Croatia, RP-170376.

* cited by examiner

| UL/DL Configuration | DL to UL switch-point periodicity | Subframe Number | | | | | | | | | | Number of subframes/frame | | |
|---|---|---|---|---|---|---|---|---|---|---|---|---|---|---|
| | | 0 | 1 | 2 | 3 | 4 | 5 | 6 | 7 | 8 | 9 | DL | UL | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

Figure 1
(prior art)

Figure 2:
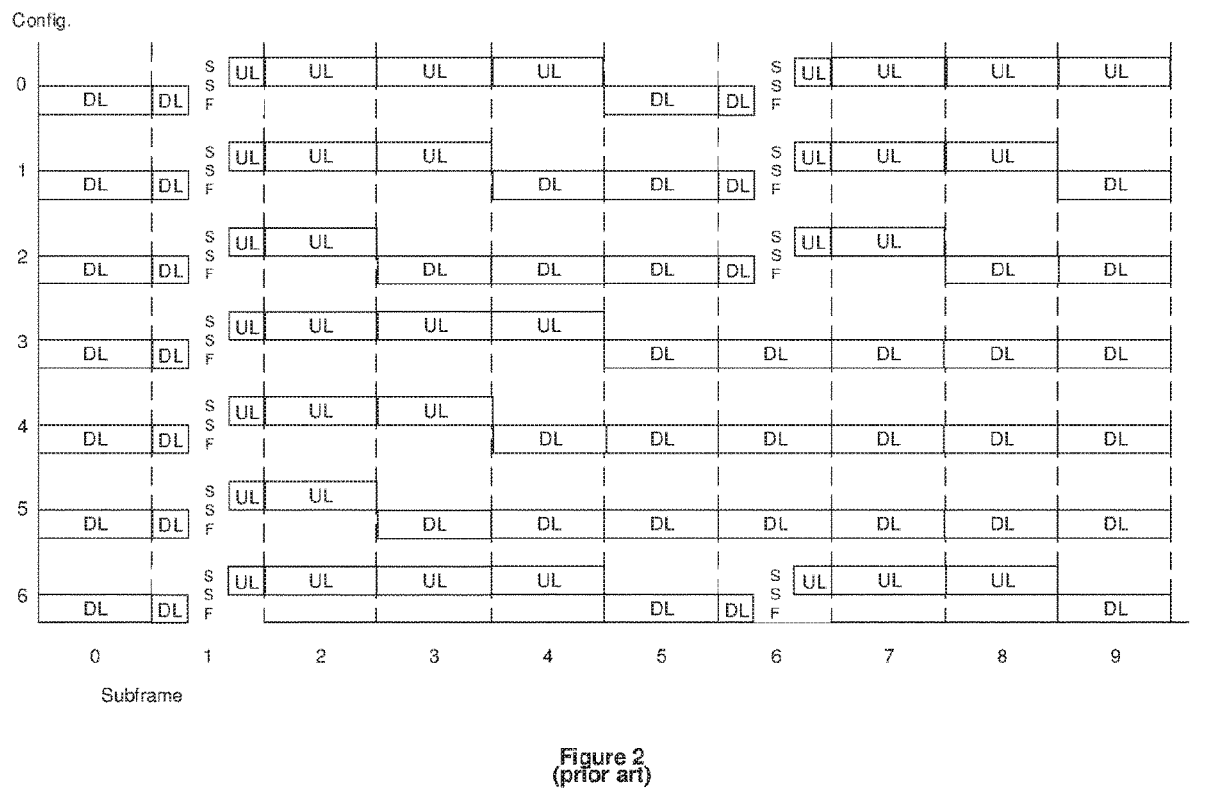

Config.

0 DL DL SSF UL UL UL UL DL DL SSF UL UL UL UL
1 DL DL SSF UL UL UL DL DL DL SSF UL UL UL DL
2 DL DL SSF UL UL DL DL DL DL SSF UL UL DL DL
3 DL DL SSF UL UL UL UL DL DL DL DL DL
4 DL DL SSF UL UL UL DL DL DL DL DL DL
5 DL DL SSF UL UL DL DL DL DL DL DL DL
6 DL DL SSF UL UL UL UL DL DL SSF UL UL UL DL 0 1 2 3 4 5 6 7 8 9

Subframe

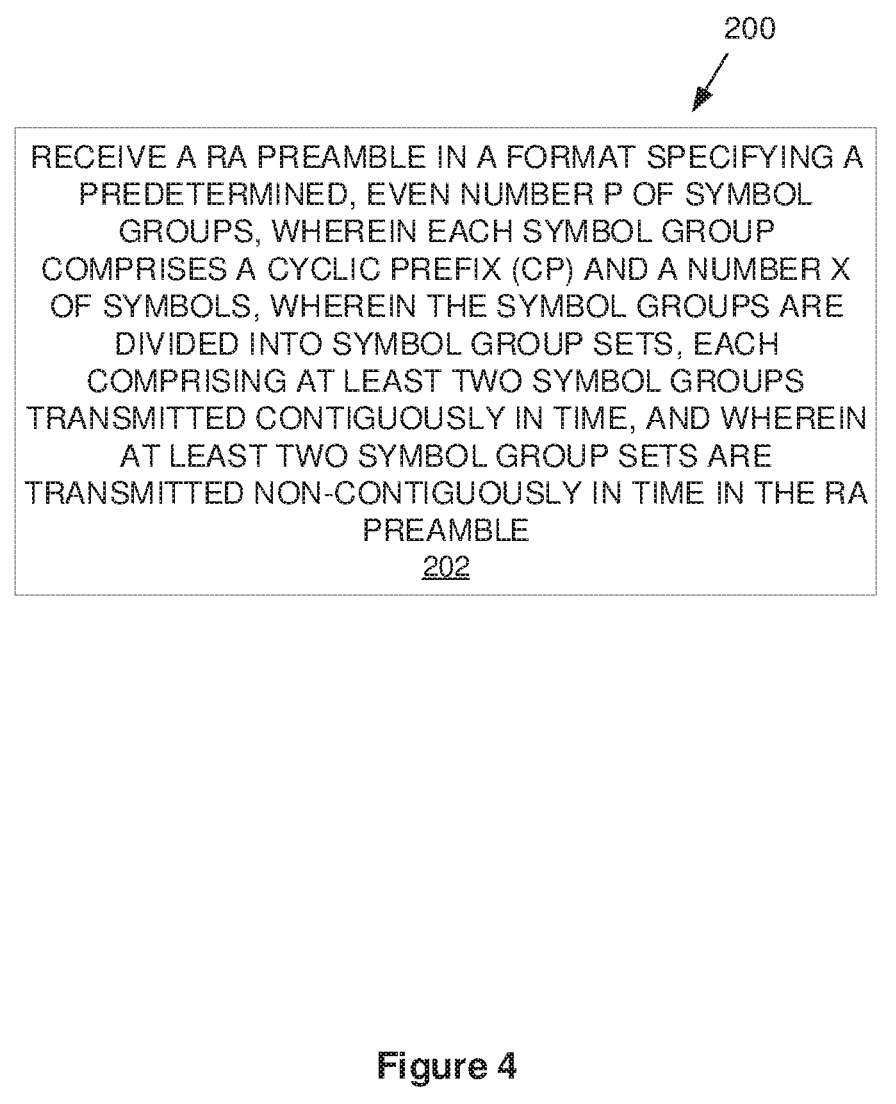

RECEIVE A RA PREAMBLE IN A FORMAT SPECIFYING A PREDETERMINED, EVEN NUMBER P OF SYMBOL GROUPS, WHEREIN EACH SYMBOL GROUP COMPRISES A CYCLIC PREFIX (CP) AND A NUMBER X OF SYMBOLS, WHEREIN THE SYMBOL GROUPS ARE DIVIDED INTO SYMBOL GROUP SETS, EACH COMPRISING AT LEAST TWO SYMBOL GROUPS TRANSMITTED CONTIGUOUSLY IN TIME, AND WHEREIN AT LEAST TWO SYMBOL GROUP SETS ARE TRANSMITTED NON-CONTIGUOUSLY IN TIME IN THE RA PREAMBLE
202

Figure 4

| | 1st Symbol Group | 2nd Symbol Group | 3rd Symbol Group | 4th Symbol Group | GT | Nominal Cell Size (proprietary solution may enable support of larger cell size) | CP + GT Overhead |
|---|---|---|---|---|---|---|---|
| 3 SF NPRACH (4 symbol groups) | ~266.7 us CP + one 266.7 us symbol | ~266.7 us CP + one 266.7 us symbol | ~266.7 us CP + two 266.7 us symbol | ~266.7 us CP + two 266.7 us symbol | ~333 us | 40 Km | ~46% |
| 3 SF NPRACH (3 symbol groups) | ~266.7 us CP + one 266.7 us symbol | ~266.7 us CP + two 266.7 us symbol | ~266.7 us CP + four 266.7 us symbol | NA | ~333 us | 40 Km | ~37% |
| 3 SF NPRACH (2 symbol groups) | ~266.7 us CP + four 266.7 us symbol | ~266.7 us CP + four 266.7 us symbol | NA | NA | ~333 us | 40 Km | ~28% |

FIGURE 9

| | 1st Symbol Group | 2nd Symbol Group | 3rd Symbol Group | 4th Symbol Group | GT | Nominal Cell Size (proprietary solution may enable support of larger cell size) | CP + GT Overhead |
|---|---|---|---|---|---|---|---|
| 2 SF NPRACH (4 symbol groups) | ~186.6 us CP + one 266.7 us symbol | ~186.6 us CP + one 2.667 us symbol | ~186.6 us CP + one 266.7 us symbol | ~186.6 us CP + one 266.7 us symbol | ~186.6 us | 28 Km | ~46% |
| 2 SF NPRACH (3 symbol groups) | ~233.3 us CP + one 266.7 us symbol | ~233.3 us CP + one 266.7 us symbol | ~233.3 us CP + two 266.7 us symbol | NA | ~233.3 us | 35 Km | ~46% |
| 2 SF NPRACH (3 symbol groups) | ~266.7 us CP + one 266.7 us symbol | ~266.7 us CP + one 266.7 us symbol | ~266.7 us CP + one 266.7 us symbol | NA | ~400 us | 40 Km | ~60% |
| 2 SF NPRACH (2 symbol groups) | ~222.2 us CP + two 266.7 us symbol | ~222.2 us CP + three 266.7 us symbol | NA | NA | ~222.2 us | 33 Km | ~33% |
| 2 SF NPRACH (2 symbol groups) | ~266.7 us CP + two 266.7 us symbol | ~266.7 us CP + two 266.7 us symbol | NA | NA | ~400 us | 40 Km | ~46% |

FIGURE 10

| | 1st Symbol Group | 2nd Symbol Group | 3rd Symbol Group | 4th Symbol Group | GT | Nominal Cell Size (proprietary solution may enable support of larger cell size) | CP + GT Overhead |
|---|---|---|---|---|---|---|---|
| 1 SF NPRACH (2 symbol groups) | ~155.5 us CP + one 266.7 us symbol | ~155.5 us CP + one 2.667 us symbol | NA | NA | ~155.53 us | 23.3 Km | ~48% |

FIGURE 11

NPRACH FORMATS FOR NB-IOT TRANSMISSION IN TDD MODE

This application claims priority to U.S. Provisional Application Ser. No. 62/564,542, filed 28 Sep. 2018, titled "NPRACH Formats for NP-IoT [sic.] Transmissions in TDD Mode."

TECHNICAL FIELD

The present invention relates generally to wireless communication networks, and in particular to NarrowBand Internet of Things (NB-IoT) Physical Random Access Channel (NPRACH) format design for Time Division Duplex (TDD) mode.

BACKGROUND

Wireless communication networks, enabling voice and data communications to mobile devices, are ubiquitous in many parts of the world, and continue to advance in technological sophistication, system capacity, data rates, bandwidth, supported services, and the like. A basic model of one type of wireless networks, generally known as "cellular," features a plurality of fixed network nodes (known variously as base station, radio base station, base transceiver station, serving node, NodeB, eNobeB, eNB, and the like), each providing wireless communication service to a large plurality of mobile devices (known variously as mobile terminals, User Equipment or UE, and the like) within a generally fixed geographical area, known as a cell or sector.

Duplex

Communication from a network node to a mobile device is denominated as "downlink" (DL), and communication from a mobile device to the network node is denominated as "uplink" (UL). There are two basic ways to separate these two streams of traffic. In Frequency Division Duplex (FDD), UL and DL communications are separated in frequency (but may occur simultaneously in time). In Time Division Duplex (TDD), UL and DL communications occur on the same frequency, but are separated in time, with a Guard Period (GP), or brief time duration, interposed between them to prevent interference.

NB-IoT

While one aspect of wireless communication development is towards ever-higher bandwidth and data rates (e.g., supporting a wide variety of services delivered to sophisticated cellular phones such as "smartphones"), another recent development is in the opposite direction—providing limited-bandwidth, low-data-rate service to simple, cheap devices with very low power budgets. In Release 13, the Third Generation Partnership Project (3GPP) standardized two different approaches to this so-called "machine type communications" or MTC. Enhanced MTC (eMTC), also known as Long Term Evolution—Machine-to-machine (LTE-M), includes cost reduction measures such as lower bandwidth, lower data rates, and reduced transmit power, as compared to legacy (broadband) LTE. NarrowBand Internet of Things (NB-IoT) more aggressively addresses the extremely low cost market with less than 200 KHz of spectrum and flexibility to deploy concurrently with legacy networks or outside of active legacy spectrum. NB-IoT targets improved indoor coverage, support for massive numbers of low throughput devices, low delay sensitivity, ultra-low device cost, and low device power consumption.

Early NB-IoT specifications adopted FDD. A need exists to define the standards for TDD operation in NB-IoT. This presents numerous challenges, particularly in the case of random access, the process by which a mobile device first accesses the network.

Random Access

A mobile device may need to contact the network (via the eNodeB) without having a dedicated resource in the UL. To handle this, a random access procedure is available where a UE that does not have a dedicated uplink resource may transmit a signal to the base station. The first message (MSG1 or random access preamble as descried herein) of this procedure is typically transmitted on a special uplink resource reserved for random access, a Physical Random Access Channel (PRACH), with other uplink resources being used for data transmission. This channel can for instance be limited in time and/or frequency (as in LTE).

The resources available for PRACH transmission are provided to the mobile devices as part of the broadcasted system information (or as part of dedicated RRC signaling in case of handover, for example).

The random access procedure can be used for a number of different reasons. Among these reasons are:

- Initial access (for UEs in the LTE_IDLE or LTE_DETACHED states)
- Incoming handover
- Resynchronization of the UL
- Scheduling request (for a UE that is not allocated any other resource for contacting the base station)
- Positioning In a contention-based random access (CBRA) procedure the UE starts the random access procedure by selecting or randomly selecting one of the preambles available for contention-based random access. The UE then transmits the selected Random Access Preamble message on the PRACH to a network node such as an eNodeB in the network.

The network acknowledges any preamble it detects by transmitting a Random Access Response message (MSG2) which may include at least one of an initial grant to be used on the uplink shared channel, a temporary Cell-Radio Network Temporary Identifier (C-RNTI), and a time alignment (TA) update based on the timing offset of the preamble measured by the eNodeB on the PRACH. The Random Access Response message (MSG2) is transmitted in the downlink to the UE and its corresponding Physical Downlink Control Channel (PDCCH) message's Cyclic Redundancy Check (CRC) may be scrambled with the Random Access-Radio Network Temporary Identifier (RA-RNTI).

Upon receiving the Random Access Response message (MSG2), the UE uses the grant to transmit a Scheduled Transmission message (MSG3) that in part is used to trigger the establishment of radio resource control and in part to uniquely identify the UE on the common channels of the cell. The timing advance command provided in the Random Access Response message may be applied in the UL transmission in the Scheduled Transmission message (MSG3). The eNodeB can change the resources blocks that are assigned for a Scheduled Transmission message (MSG3) by sending an uplink grant, the CRC of which is scrambled with the Temporary Cell-Radio Network Temporary Identifier (TC-RNTI).

The Contention Resolution message (MSG4) then has its PDCCH CRC scrambled with the C-RNTI if the UE previously has a C-RNTI assigned. If the UE does not have a C-RNTI previously assigned, it has its PDCCH CRC scrambled with the TC-RNTI.

The procedure ends with the network solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that must be resolved through the Contention Resolution message (MSG4). In some cases, two UEs can transmit the same preamble, at the same time. A third UE could also transmit at the same RACH, but since it transmits with a different preamble, there is no contention between this UE and the other two UEs.

It is noted that a UE can also perform non-contention based random access. A non-contention based random access or contention free random access (CFRA) can, for example, be initiated by the eNodeB to get the UE to achieve synchronization in the uplink. The eNodeB initiates a contention free random access either by sending a PDCCH order or indicating it in an RRC message. The later of the two is used in case of handover.

TDD in NB-IoT

According to the Work Item Description (WID) on further NB-IoT enhancements [see 3GPP RP-170732, "New WI on Further NB-IoT enhancements", RAN #75], revised in [RP-171428, "Way Forward on Prioritization of NB-IoT", RAN #76] and recently in [RP-172063, "Revised WID on Further NB-IoT enhancements", RAN 77], one of the objectives refers to work on the support of the TDD operation into NB-IoT, which commenced from the RAN plenary #76.

B. Work on the Following Objective to Commence from RAN #76

Support for TDD [RAN1, RAN2, RAN4]

Specify TDD support for in-band, guard-band, and stand-alone operation modes of NB-IoT. The design shall assume no UL compensation gaps are needed by UE, and strive towards a common design among the deployment modes.

- Relaxations of MCL and/or latency and/or capacity targets to be considered by RAN1.
- Baseline is to support the same features as Rel-13 NB-IoT, additionally considering small-cells scenarios.
- In addition to the baseline, support the following:
  - Based on Rel-14 FDD designs:
    - OTDOA positioning using Rel-14 NPRS RE patterns and sequences. Subframe configurations Part A and Part B shall be used with necessary amendments, if any.
    - Non-anchor carrier operation for paging and random access
    - UE category NB2, with the same TBS table as FDD, and support for 1 and 2 UL/DL HARQ processes. The support of 2 UL/DL HARQ processes by UE is an optional capability available to Cat NB2, i.e. same way as FDD.
  - Non-anchor carrier operation for system information (MIB-NB and any SIB-NB) can be considered.
- Specify band specific requirements for band 41.

The WID on "further NB-IoT enhancements" highlights the importance of supporting the TDD operation into NB-IoT. The text shown below can be found as part of the WID's justification [RP-170732, "New WI on Further NB-IoT enhancements", RAN #75.]:

The expedited standardization process in Rel-13 developed the air interface to support half-duplex FDD. However, TDD spectrum also exists globally, including regulatory environments and operator markets where there is strong un-met demand for NB-IoT. In some cases this demand has existed since the early phases of the Rel-13 work.

Therefore, Rel-15 is the right time to add TDD support into NB-IoT, after establishing what the needed targets in terms of coverage, latency, etc. should be.

Before going further on the TDD support into NB-IoT, it is important to highlight that the fundamental difference between FDD and TDD is that in a time division duplex operation the same carrier frequency is used for downlink and uplink transmissions.

In a TDD operation, the downlink and uplink radio resources have been made to coexist within the same radio frame, with the switching between downlink and uplink being performed during a guard period contained within a special subframe. Table 1, recreated in FIG. 1, shows the existing LTE TDD configurations as described by the LTE standard [3GPP TS 36.211, "Physical channels and modulation", v14.2.0], where D=Downlink; U=Uplink; S=Special Subframe. This information is also depicted in graphic format in FIG. 2.

The existing LTE TDD configurations exist in a well-defined and commercially used framework. Therefore, it is foreseen that the existing (or some of the existing) LTE TDD configurations will be used as a baseline for introducing the TDD support into NB-IoT. This is especially important for "in-band" and "guard-band" deployments, but relevant as well for "stand-alone" operation mode considering that there might be two variants: in the same band; and far away from the mobile broadband (in frequency).

Random Access via TDD in NB-IoT

In RAN1 #90, the TSG RAN WG1 started the discussions on the support of the TDD operation into NB-IoT, where most of the discussions focused on DL and common aspects. Only the following agreements were reached for UL aspects [3GPP Final RAN1 Chairman Notes, RAN1 #90], particularly the NarrowBand Internet of Things (NB-IoT) Physical Random Access Channel (NPRACH):

Agreements:
- NPRACH for TDD supports single-tone with frequency hopping
- Multi-tone NPRACH formats can also be considered
- FFS details of frequency hopping
- One symbol group is defined by one CP, and N symbols.
- FFS the value(s) of N
- FFS CP durations, symbol duration
- A preamble is defined by P symbol groups
- FFS: Guard time usage
- Repetition of NPRACH preamble is supported
- The cell radius target for TDD NPRACH is FFS The NPRACH carries physical layer random access preambles that are used by NB-IoT UEs camping on a given cell to indicate to the base station the intention to acquire access.

The NPRACH as it was designed for NB-IoT includes the following characteristics:
- A preamble consists of four symbol groups transmitted next to each other using a different subcarrier per symbol group.
- Each symbol group has a Cyclic Prefix (CP) followed by 5 symbols; the CP has different duration depending on the preamble format.
- Deterministic hopping pattern as well as pseudo-random hopping are used.
- The NPRACH tone spacing is 3.75 kHz.
- NPRACH preamble repetition unit is 5.6 ms or 6.4 ms depending on the CP.
- Number of repetitions: 1, 2, 4, 8, 16, 32, 64, 128 (or, more generally, any zero or positive integer power of 2).

In principle, due to the limited amount of UL resources, there is no TDD configuration that can host the NPRACH preamble repetition unit as it was designed for NB-IoT.

This disclosure relates to a NPRACH design that adjusts to the TDD configurations, and that therefore can be used for the support of TDD into NB-IoT.

The legacy LTE TDD configurations only have 1, 2, or 3 contiguous UL subframes (i.e., 1, 2, or 3 ms respectively), while the transmission of a single NPRACH as designed in Rel-13 for NB-IoT FDD takes, in the time domain, 5.6 ms (with 66.7 us CP) or 6.4 ms (with 266.7 us CP).

This means that in principle there is no TDD configuration that in terms of contiguous UL subframes can host the NPRACH preamble repetition unit as it was designed for FDD NB-IoT (i.e., the preamble repetition unit of NPRACH goes beyond 5 ms).

If the Rel-13 NPRACH design is directly used for TDD, a single NPRACH transmission must be divided into several discontinuous uplink transmissions. This might result in loss of coherent NPRACH across symbol groups or force the UE to maintain coherence over these discontinuities. In addition, hardware introduces random phase which might be a problem for maintaining the phase coherency.

Moreover, requirements may have to be relaxed on the amount of delay needed to detect the PRACH. In case of in-band/guard-band deployment, NB-IoT TDD configurations should follow the same configurations of LTE and in this case there is no escape from this problem.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a design for NPRACH formats is implemented for NB-IoT in TDD mode. This design features:

- Multiple NPRACH formats are supported so that the TDD deployment can choose the most suitable NPRACH format according to the TDD configuration used.
- Since the UE may or may not maintain coherence over discontinuous NPRACH transmissions, at least two symbol groups at different subcarriers should be transmitted back-to-back—that is, contiguously in the time domain—to facilitate time-of-arrival estimation at eNBs.
- A 3.75 kHz subcarrier spacing is considered for the NPRACH design in TDD NB-IoT since such a value was used in Rel-13 FDD, which will allow for a good co-existence with the multi-tone transmissions of NPUSCH if the FDD design is re-used for TDD.
- To avoid NPRACH interference to DL transmission, guard period (GP) at the end of NPRACH transmission is provided.
- In some embodiments, a NPRACH preamble repetition unit in NB-IoT TDD consists of 4 symbol groups.
- Frequency hopping in a NPRACH preamble repetition unit is deterministic.
- For frequency hopping across repetition units, cell specific pseudo random hopping can be applied.

A NPRACH design for TDD operation encompasses several formats, so that the TDD deployment can choose the most suitable NPRACH format according to the TDD configuration used. The NPRACH for TDD uses a 3.75 kHz subcarrier spacing, where at least two symbol groups at different subcarriers should be transmitted back-to-back accompanied by a guard period, and where, in some embodiments, a NPRACH preamble repetition unit in NB-IoT TDD consists of 4 symbol groups. Frequency hopping in a NPRACH preamble repetition unit is deterministic, while frequency hopping across repetition units can use cell specific pseudo random hopping.

Certain embodiments can provide one or more of the following technical advantage(s):

- The NPRACH preamble repetition unit can be fit into the LTE TDD configurations.
- The Multiple NPRACH formats can be used to offer compatibility over all the existing LTE TDD configurations.
- Transmitting at least two symbols groups back-to-back at different subcarriers facilitate the time-of-arrival estimation at eNBs.
- Re-using a subcarrier spacing equal to 3.75 KHz for NPRACH in TDD facilitates the co-existence with NPRACH in FDD if this one re-uses the Multi-tone transmissions schemes used for NPUSCH FDD.
- Having a guard period (GP) at the end of NPRACH transmission prevents causing interference to an adjacent DL transmission.
- The Multiple NPRACH formats making use of configurable CP and symbol lengths per symbol group to allow reaching different cell size targets.
- Cell specific pseudo random hopping helps to avoid NPRACH collisions As used herein, the terms "Guard Time (GT)" and "Guard Period (GP)" are used interchangeably to denote a period, or duration of time, interposed between UL and DL TDD transmissions to mitigate interference. In particular, a GP is added at least to the end of every PRACH preamble format defined herein. Each PRACH preamble format thus comprises a predetermined number of symbol groups followed by a GP, wherein each symbol group comprises a Cyclic Prefix (CP) and a number X of symbols.

One embodiment relates to a method, performed by a wireless device, of transmitting a Random Access (RA) preamble in Time Division Duplex (TDD), from the wireless device to a base station. A RA preamble format specifying a predetermined, even number P of symbol groups composing a RA preamble is selected, wherein each symbol group comprises a Cyclic Prefix (CP) and a number X of symbols. The P symbol groups are divided into symbol group sets fitting into 1, or 2, or 3 contiguous uplink subframes, each comprising at least two symbol groups transmitted contiguously in time, and at least two symbol group sets are transmitted non-contiguously in time across a number of uplink subframes over which the RA preamble is transmitted.

Another embodiment relates to a wireless device configured to transmit a Random Access (RA) preamble in Time Division Duplex (TDD) to a base station in a wireless communication network. The wireless device includes a transceiver and processing circuitry operatively connected to the transceiver. The processing circuitry is adapted to select a RA preamble format specifying a predetermined, even number P of symbol groups composing a RA preamble, wherein each symbol group comprises a Cyclic Prefix (CP) and a number X of symbols. The P symbol groups are divided into symbol group sets fitting into 1, or 2, or 3 contiguous uplink subframes, each comprising at least two symbol groups transmitted contiguously in time, and at least two symbol group sets are transmitted non-contiguously in time across a number of uplink subframes over which the RA preamble is transmitted.

Yet another embodiment relates to a method, performed by a base station operative in a wireless communication network, of receiving a Random Access (RA) preamble in Time Division Duplex (TDD), from a wireless device. A RA preamble is received. The RA preamble is in a format specifying a predetermined, even number P of symbol groups composing a RA preamble, wherein each symbol group comprises a Cyclic Prefix (CP) and a number X of symbols. The P symbol groups are divided into symbol group sets fitting into 1, or 2, or 3 contiguous uplink subframes, each comprising at least two symbol groups transmitted contiguously in time, and at least two symbol group sets are transmitted non-contiguously in time across a number of uplink subframes over which the RA preamble is transmitted.

Still another embodiment relates to a base station operative in a wireless communication network and configured to receive a Random Access (RA) preamble in Time Division Duplex (TDD) from a wireless device. The base station includes a transceiver and processing circuitry operatively connected to the transceiver. The processing circuitry is adapted to receive a RA preamble in a format specifying a predetermined, even number P of symbol groups composing a RA preamble, wherein each symbol group comprises a Cyclic Prefix (CP) and a number X of symbols. The P symbol groups are divided into symbol group sets fitting into 1, or 2, or 3 contiguous uplink subframes, each comprising at least two symbol groups transmitted contiguously in time, and at least two symbol group sets are transmitted non-contiguously in time across a number of uplink subframes over which the RA preamble is transmitted.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 is a table of LTE subframe configurations for TDD.

FIG. 2 is a graphic depiction of the table of FIG. 1.

FIG. 4 is a flow diagram of a (single-step) method of receiving, at a base station, a RA preamble in TDD, transmitted by a wireless device.

FIG. 9 is a table of NPRACH design options that fit with TDD configurations having three contiguous UL subframes.

FIG. 10 is a table of NPRACH design options that fit with TDD configurations having two contiguous UL subframes.

FIG. 11 is a table of NPRACH design options that fit with TDD configurations without multiple contiguous UL subframes.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 3:
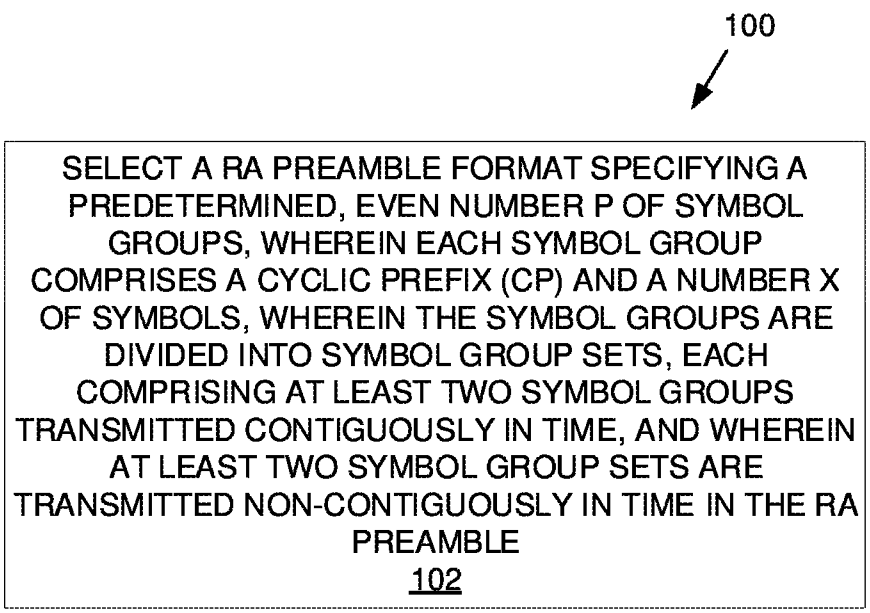
FIG. 3 is a flow diagram of a (single-step) method of transmitting a RA preamble in TDD, from a wireless device to a base station.

FIG. 3 depicts a method 100 in accordance with particular embodiments. The method 100 is performed by a wireless device, and the method 100 is of transmitting a Random Access (RA) preamble in Time Division Duplex (TDD), from the wireless device to a base station. In the broadest formulation, the method 100 comprises a single step, numbered 102. The method 100 includes selecting a RA preamble format specifying a predetermined, even number P of symbol groups composing a RA preamble, wherein each symbol group comprises a Cyclic Prefix (CP) and a number X of symbols (step 102). The P symbol groups are divided into symbol group sets fitting into 1, or 2, or 3 contiguous uplink subframes, each comprising at least two symbol groups transmitted contiguously in time, and at least two symbol group sets are transmitted non-contiguously in time across a number of uplink subframes over which the RA preamble is transmitted. A related step (not shown in FIG. 3) is transmitting a RA preamble based on the selected RA preamble format. The RA preamble may be transmitted on the NarrowBand Internet of Things Physical Random Access Channel (NPRACH).

In one embodiment of the method 100, a number G of symbol groups in a symbol group set is 2 or 3.

In one embodiment of the method 100, P=2G, and each symbol group set of G symbol groups is followed by a Guard Period (GP).

In one embodiment of the method 100, the symbol groups within a symbol group set are transmitted on adjacent uplink subframes.

In one embodiment of the method 100, the method further includes transmitting a RA preamble, based on the selected RA preamble format, a predetermined number $N_{rep}^{NPRACH}$ of times.

In one embodiment of the method 100, selecting a RA preamble format comprises selecting a RA preamble format from among a predetermined set of RA preamble formats, each of which can be mapped onto a number of adjacent subframes in a predetermined TDD configuration. In one embodiment of the method 100, the TDD configuration is a Long Term Evolution (LTE) TDD configuration defined in Third Generation Partnership Project (3GPP) Technical Specification (TS) 36.211. In one embodiment of the method 100, the predetermined set of RA preamble formats includes:

Format 0 wherein G=2, P=4, and N=1;
Format 1 wherein G=2, P=4, and N=4;
Format 2 wherein G=2, P=4, and N=4
Format 0-a wherein G=3, P=6, and N=1; and
Format 1-a wherein G=3, P=6, and N=2.

In one embodiment of the method 100:

Format 0 can be mapped to LTE TDD configurations 1, 2, 3, 4, or 5;
Format 1 can be mapped to LTE TDD configurations 1 or 4;
Format 2 can be mapped to LTE TDD configuration 3;
Format 0-a can be mapped to LTE TDD configurations 1, 2, 3, 4, or 5; and
Format 1-a can be mapped to LTE TDD configurations 1 or 4;

FIG. 4 depicts a method 200 in accordance with other particular embodiments. The method 200 is performed by a base station, and the method 200 is of receiving a Random Access (RA) preamble in Time Division Duplex (TDD), from a wireless device. In the broadest formulation, the method 200 comprises a single step, numbered 202. The method 200 includes receiving a RA preamble format specifying a predetermined, even number P of symbol groups composing a RA preamble, wherein each symbol group comprises a Cyclic Prefix (CP) and a number X of symbols (step 202). The P symbol groups are divided into symbol group sets fitting into 1, or 2, or 3 contiguous uplink subframes, each comprising at least two symbol groups transmitted contiguously in time. At least two symbol group sets are transmitted non-contiguously in time across a number of uplink subframes over which the RA preamble is transmitted. The RA preamble may be transmitted by a wireless device on the NarrowBand Internet of Things Physical Random Access Channel (NPRACH).

In one embodiment of the method 200, a number G of symbol groups in a symbol group set is 2 or 3.

In one embodiment of the method 200, P=2G, and each symbol group set of G symbol groups is followed by a Guard Period (GP).

In one embodiment of the method 200, the symbol groups within a symbol group set are transmitted on adjacent uplink subframes.

In one embodiment of the method 200, the method further includes receiving a RA preamble, based on the selected RA preamble format, a predetermined number $N_{rep}^{NPRACH}$ of times.

In one embodiment of the method 200, a RA preamble format is selected from among a predetermined set of RA preamble formats, each of which can be mapped onto a number of adjacent subframes in a predetermined TDD configuration. In one embodiment of the method 200, the TDD configuration is a Long Term Evolution (LTE) TDD configuration defined in Third Generation Partnership Project (3GPP) Technical Specification (TS) 36.211. In one embodiment of the method 200, the predetermined set of RA preamble formats includes:

Format 0 wherein G=2, P=4, and N=1;
Format 1 wherein G=2, P=4, and N=4;
Format 2 wherein G=2, P=4, and N=4
Format 0-a wherein G=3, P=6, and N=1; and
Format 1-a wherein G=3, P=6, and N=2.

Figure 5:
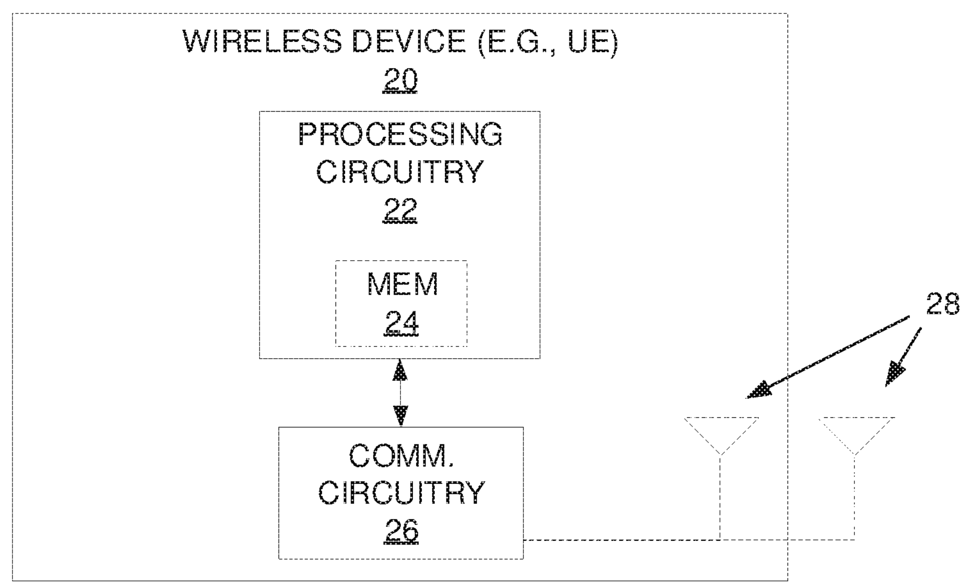
FIG. 5 is a block diagram of a wireless device showing circuitry.

In one embodiment of the method 200:

Format 0 can be mapped to LTE TDD configurations 1, 2, 3, 4, or 5;
Format 1 can be mapped to LTE TDD configurations 1 or 4;
Format 2 can be mapped to LTE TDD configuration 3;
Format 0-a can be mapped to LTE TDD configurations 1, 2, 3, 4, or 5; and
Format 1-a can be mapped to LTE TDD configurations 1 or 4;

Note that apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein FIG. 5 for example illustrates a wireless device 20 as implemented in accordance with one or more embodiments. As shown, the wireless device 20 includes processing circuitry 22 and communication circuitry 26. The communication circuitry 26 (e.g., radio circuitry, such as a transceiver) is configured to transmit and/or receive information to and/or from one or more other nodes, e.g., via any communication technology. Such communication may occur via one or more antennas 28 that are either internal or external to the wireless device 20. The processing circuitry 22 is configured to perform processing described above, such as by executing instructions stored in memory 24 (which may be internal, as shown, or external to the processing circuitry 22). The processing circuitry 22 in this regard may implement certain functional means, units, or modules. The wireless device 20 may comprise a User Equipment (UE).

Figure 6:
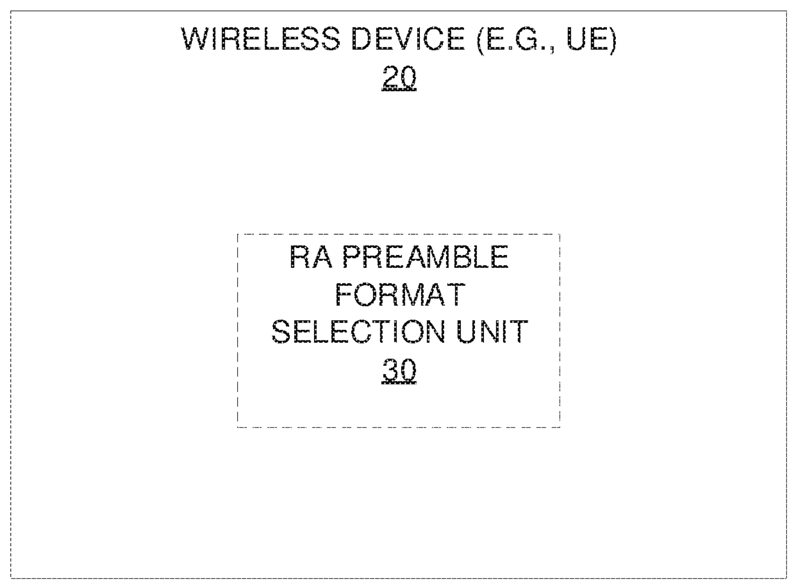
FIG. 6 is a block diagram of a wireless device showing functional units.

FIG. 6 illustrates a schematic block diagram of a wireless device 20 in a wireless network according to still other embodiments. As shown, the wireless device 20 implements various functional means, units, or modules, e.g., via the processing circuitry 22 in FIG. 5 and/or via software code. These functional means, units, or modules, e.g., for implementing the method 100 herein, include for instance: RA preamble format selection unit 30. RA preamble format selection unit 30 is configured to select a RA preamble format specifying a predetermined, even number P of symbol groups composing a RA preamble, wherein each symbol group comprises a Cyclic Prefix (CP) and a number X of symbols, wherein the P symbol groups are divided into symbol group sets fitting into 1, or 2, or 3 contiguous uplink subframes, each comprising at least two symbol groups transmitted contiguously in time, and wherein at least two symbol group sets are transmitted non-contiguously in time across a number of uplink subframes over which the RA preamble is transmitted.

Figure 7:
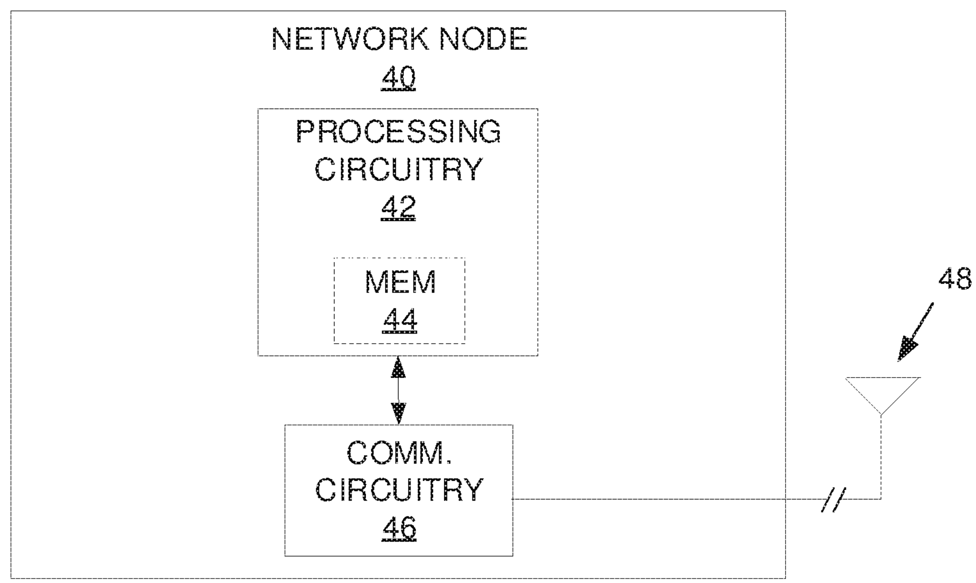
FIG. 7 is a block diagram of a network node showing circuitry.

FIG. 7 illustrates a network node 40 as implemented in accordance with one or more embodiments. As shown, the network node 40 includes processing circuitry 42 and communication circuitry 46. The communication circuitry 46 is configured to transmit and/or receive information to and/or from one or more other nodes, e.g., via any communication technology. The processing circuitry 42 is configured to perform processing described above, such as by executing instructions stored in memory 44. The processing circuitry 42 in this regard may implement certain functional means, units, or modules. The network node 40 may comprise a base station, in which case the communication circuitry 46 includes radio communication circuits such as a transceiver operatively connected to one or more antennas 48. As indicated by the broken connection, the antenna(s) may be located remotely, such as on a tower or building.

Figure 8:
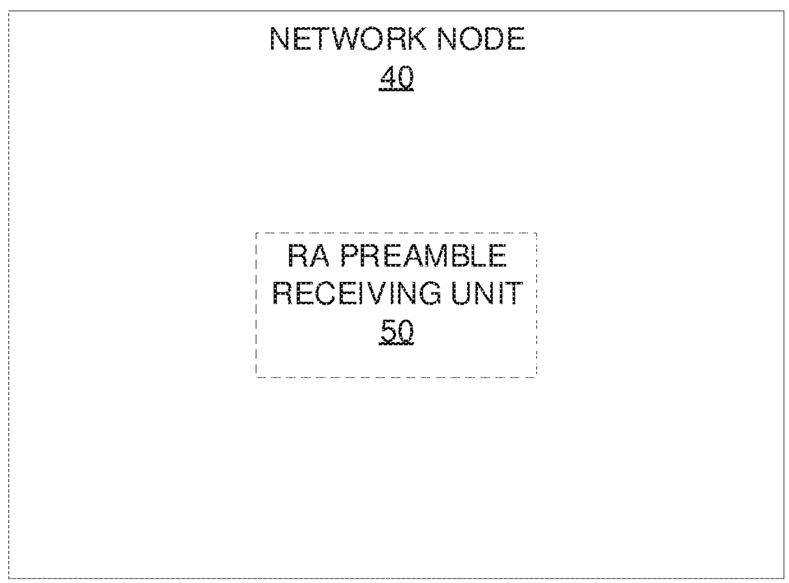
FIG. 8 is a block diagram of a network node showing functional units.

FIG. 8 illustrates a schematic block diagram of a network node 40 in a wireless network according to still other embodiments. As shown, the network node 40 implements various functional means, units, or modules, e.g., via the processing circuitry 42 in FIG. 7 and/or via software code. These functional means, units, or modules, e.g., for implementing the method 200 herein, include for instance: RA preamble receiving unit 50. RA preamble receiving unit 50 is configured to receive a RA preamble format specifying a predetermined, even number P of symbol groups composing a RA preamble, wherein each symbol group comprises a Cyclic Prefix (CP) and a number X of symbols, the P symbol groups are divided into symbol group sets fitting into 1, or 2, or 3 contiguous uplink subframes, each comprising at least two symbol groups transmitted contiguously in time, and wherein at least two symbol group sets are transmitted non-contiguously in time across a number of uplink subframes over which the RA preamble is transmitted.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

A detailed description of the NPRACH design for NB-IoT TDD is presented below.

3-Subframe (SF) NPRACH Symbol Structure

FIG. 9 is a table listing NPRACH design options that fit with TDD configurations that have 3 contiguous UL subframes. As in FDD NPRACH, each symbol group consists of 1 CP+X symbols. To reduce the resource waste, X can be different across symbol groups.

- 4 symbol groups in 3 UL SFs: there are 6 symbols in total across the 4 symbol groups, with X=1, X=1, X=2, X=2 in the $1^{st}$, $2^{nd}$, $3^{rd}$, $4^{th}$ symbol group, respectively.
- 3 symbol groups in 3 UL SFs: there are 7 symbols in total across the 3 symbol groups, with X=1, X=2, X=4 in the $1^{st}$, $2^{nd}$, $3^{rd}$ symbol group, respectively.
- 2 symbol groups in 3 UL SFs: there are 8 symbols in total across the 2 symbol groups, with X=4, X=4 in the $1^{st}$, $2^{nd}$ symbol group, respectively.

The CP in all cases is chosen to be 266.7 us, which is the same as the long CP in Rel-13 FDD NPRACH. The remaining GP is ~333 us. Under these design options, the nominal supported cell radius is 40 km, which is the same as Rel-13 FDD NPRACH. However, proprietary solutions may be used to enable deployment with cell radius larger than 40 km.

2-SF NPRACH Symbol Structure

FIG. 10 lists NPRACH design options that fit with TDD configurations that have 2 continuous UL subframes. As in FDD NPRACH, each symbol group consists of 1 CP+X symbols. To reduce the resource waste, X can be different across symbol groups.

- 4 symbol groups in 2 UL SFs: there are 4 symbols in total across the 4 symbol groups, with X=1, X=1, X=1, X=1 in the $1^{st}$, $2^{nd}$, $3^{rd}$, $4^{th}$ symbol group, respectively. The CP length is ~186.6 us.
- 3 symbol groups in 2 UL SFs:
  - Option 1: ~233.3 us CP: there are 4 symbols in total across the 3 symbol groups, with X=1, X=1, X=2 in the $1^{st}$, $2^{nd}$, $3^{rd}$ symbol group, respectively.
  - Option 2: ~266.7 us CP: there are 3 symbols in total across the 3 symbol groups, with X=1, X=1, X=1 in the $1^{st}$, $2^{nd}$, $3^{rd}$ symbol group, respectively
- 2 symbol groups in 2 UL SFs:
  - Option 1: ~222.2 us CP: there are 5 symbols in total across the 2 symbol groups, with X=2, X=3 in the $1^{st}$, $2^{nd}$ symbol group, respectively.
  - Option 2: ~266.7 us CP: there are 4 symbols in total across the 2 symbol groups, with X=2, X=2 in the $1^{st}$, $2^{nd}$ symbol group, respectively.

1-SF NPRACH Symbol Structure

FIG. 11 lists NPRACH design options that fit with TDD configurations that have only 1 UL subframe. To fit at least 2 symbol groups in one UL subframe, each symbol group can only have one 266.7 us symbol. The remaining time (1−0.2667*2) is equally allocated for the two CPs and GP, leading to ~155.5 us CP and ~155.5 us GP.

NPRACH Repetition Unit

Depending on the selection of the symbol structure, repetition unit can be defined accordingly.

- If 4 symbol groups can be transmitted back-to-back, a NPRACH preamble repetition unit consists of 4 symbol groups.
- If 3 symbol groups can be transmitted back-to-back, a NPRACH preamble repetition unit consists of 3 symbol groups.
- If 2 symbol groups can be transmitted back-to-back, a NPRACH preamble repetition unit consists of 4 symbol groups, with the first two symbol groups transmitted back-to-back and the last two symbol groups transmitted back-to-back, respectively.

NPRACH Frequency Hopping

To facilitate time-of-arrival estimation, both 1 tone and 6 tone hopping should be supported in a repetition unit.

- If 4 symbol groups can be transmitted back-to-back, same fixed hopping as FDD NB-IoT can be used.
- If 3 symbol groups can be transmitted back-to-back, 1 tone hopping is applied between 1st and 2nd symbol group, and 6 tone hopping is applied between 2nd and 3rd symbol group.
- If 2 symbol groups can be transmitted back-to-back, 1 tone hopping is applied for the first 2 back-to-back symbol groups, and 6 tone hopping is applied for the second 2 back-to-back symbol groups.
  - Since coherence/phase continuity is not guaranteed between non-continuous transmission, fixed hopping can be either used or not used between the 2nd and 3rd symbol groups. To randomize inter-cell interference, it may be beneficial to apply cell-specific pseudo random hopping between the 2nd and 3rd symbol groups.

Figure 12:
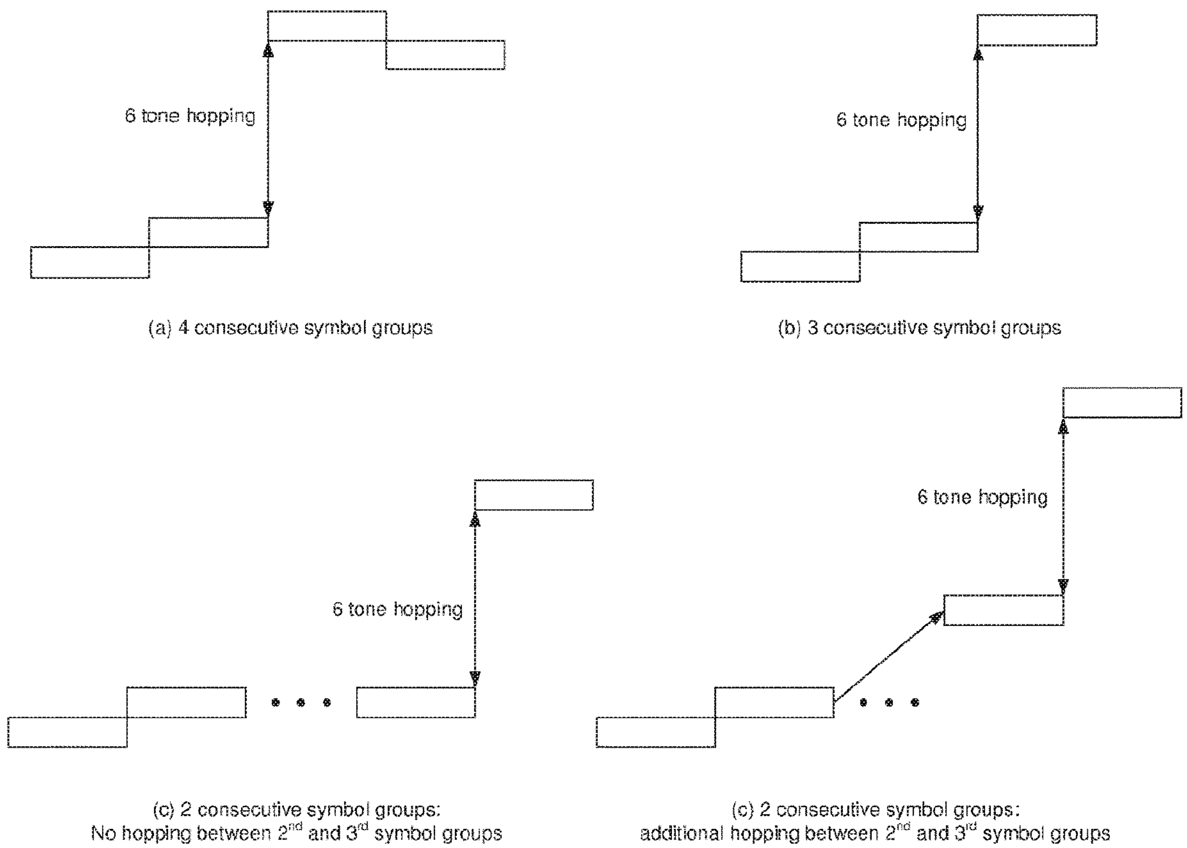
FIG. 12 is a diagram depicting various frequency hopping schemes.

The frequency hopping for different design options is illustrated in FIG. 12.

To unify the design for different TDD configurations, the following formats support NPRACH in TDD mode, where two symbol groups are transmitted back-to-back in contiguous uplink subframes:

- Format 0 (fit in 1 UL subframe)
  - $1^{st}$ symbol group: ~155.5 us CP+one 266.7 us symbol
  - $2^{nd}$ symbol group: ~155.5 us CP+one 266.7 us symbol
  - ~155.5 us GP
- Format 1 (fit in 2 UL subframes)
  - $1^{st}$ symbol group: ~222.2 us CP+two 266.7 us symbols
  - $2^{nd}$ symbol group: ~222.2 us CP+three 266.7 us symbols
  - ~222.2 us GP
- Format 2 (fit in 3 UL subframes)
  - $1^{st}$ symbol group: ~266.7 us CP+four 266.7 us symbols
  - $2^{nd}$ symbol group: ~266.7 us CP+four 266.7 us symbols
  - ~333 us GP The NPRACH formats above were designed to fit into the number of UL adjacent subframes as defined in the LTE TDD configurations, where Format 0 fits into TDD configurations having 1 UL subframe, Format 1 fits into TDD configurations having 2 UL adjacent subframes, and Format 2 fits into TDD configurations having 3 UL adjacent subframes. Thus, the configuration of the NPRACH formats can be dependent on which TDD configuration is being used. That is, the NPRACH Format 0 can be configured for the LTE TDD configuration #2, and #5, the NPRACH Format 1 can be configured for the LTE TDD configuration #1, #4, and #6, and the NPRACH Format 2 can be configured for the LTE TDD configuration #0, #3 and #6.

As mentioned earlier, in some embodiments, a NPRACH preamble repetition unit in NB-IoT TDD consists of 4 symbol groups.

Moreover, the CP lengths, symbols lengths, and GP lengths contained in a symbol group can be made configurable in order assess scenarios where the cell size targets are different. That is, the system can configure a CP with length M, a symbol with length N, and GP to have a length O, such that M, N, and O are chosen based on the cell size target, available adjacent subframes in UL, and the number of symbol groups to be fit into the available adjacent subframes in UL.

For frequency hopping in a NPRACH preamble repetition unit:

- 1 tone hopping is applied for the first 2 back-to-back symbol groups
- 6 tone hopping is applied for the second 2 back-to-back symbol groups
- Cell-specific pseudo random hopping is applied between the non-contiguous $2^{nd}$ and $3^{rd}$ symbol groups Based on c) and d) shown at the bottom of FIG. 12 the design of the deterministic hopping patterns within a NPRACH repetition unit is as follows:

TABLE 1

Deterministic hopping patterns for NPRACH in TDD, no hopping between 2nd and 3rd symbol groups

| Index of the tone used by the first symbol group | Deterministic hopping patterns within a repetition unit |
|---|---|
| 0, 2, 4 | {+1, 0, +6} |
| 1, 3, 5 | {−1, 0, +6} |
| 6, 8, 10 | {+1, 0, −6} |
| 7, 9, 11 | {−1, 0, −6} |

Applying the above:

TABLE 2

Deterministic hopping patterns per subcarrier for NPRACH in TDD, no hopping between 2nd and 3rd symbol groups

| NPRACH preamble | Tone index k(l) for symbol group l | | | |
|---|---|---|---|---|
| 0 | 0 | 1 | 1 | 7 |
| 1 | 1 | 0 | 0 | 6 |
| 2 | 2 | 3 | 3 | 9 |
| 3 | 3 | 2 | 2 | 8 |
| 4 | 4 | 5 | 5 | 11 |
| 5 | 5 | 4 | 4 | 10 |
| 6 | 6 | 7 | 7 | 1 |
| 7 | 7 | 6 | 6 | 0 |
| 8 | 8 | 9 | 9 | 3 |
| 9 | 9 | 8 | 8 | 2 |
| 10 | 10 | 11 | 11 | 5 |
| 11 | 11 | 10 | 10 | 4 |

TABLE 3

Deterministic hopping patterns for NPRACH in TDD, variable hopping between $2^{nd}$ and $3^{rd}$ symbol groups

| Index of the tone used by the first symbol group | Deterministic hopping patterns within a repetition unit |
|---|---|
| 0, 2, 4 | {+1, −X, +6} |
| 1, 3, 5 | {−1, +X, +6} |
| 6, 8, 10 | {+1, −X, −6} |
| 7, 9, 11 | {−1, +X, −6} |

Where the value of X is configurable and chosen among the values in the following set: X={0, 1, 2, 3, 4, 5}.

Applying the above, for example when X=1:

TABLE 4

Deterministic hopping patterns for NPRACH in TDD, one subcarrier hopping between 2nd and 3rd symbol groups

| NPRACH preamble | Tone index k(l) for symbol group l, with X = 1 | | | |
|---|---|---|---|---|
| 0 | 0 | 1 | 0 | 6 |
| 1 | 1 | 0 | 1 | 7 |

TABLE 4-continued

Deterministic hopping patterns for NPRACH in TDD, one subcarrier hopping between 2nd and 3rd symbol groups

| NPRACH preamble | Tone index k(l) for symbol group l, with X = 1 | | | |
|---|---|---|---|---|
| 2 | 2 | 3 | 2 | 8 |
| 3 | 3 | 2 | 3 | 9 |
| 4 | 4 | 5 | 4 | 10 |
| 5 | 5 | 4 | 5 | 11 |
| 6 | 6 | 7 | 6 | 0 |
| 7 | 7 | 6 | 7 | 1 |
| 8 | 8 | 9 | 8 | 2 |
| 9 | 9 | 8 | 9 | 3 |
| 10 | 10 | 11 | 10 | 4 |
| 11 | 11 | 10 | 11 | 5 |

Another example when X=4:

TABLE 5

Deterministic hopping patterns for NPRACH in TDD, four subcarriers hopping between 2nd and 3rd symbol groups

| NPRACH preamble | Tone index k(l) for symbol group l, with X = 1 | | | |
|---|---|---|---|---|
| 0 | 0 | 1 | 9 | 3 |
| 1 | 1 | 0 | 4 | 10 |
| 2 | 2 | 3 | 11 | 5 |
| 3 | 3 | 2 | 6 | 0 |
| 4 | 4 | 5 | 1 | 7 |
| 5 | 5 | 4 | 8 | 2 |
| 6 | 6 | 7 | 3 | 9 |
| 7 | 7 | 6 | 10 | 4 |
| 8 | 8 | 9 | 5 | 11 |
| 9 | 9 | 8 | 0 | 6 |
| 10 | 10 | 11 | 7 | 1 |
| 11 | 11 | 10 | 2 | 8 |

In addition, for frequency hopping across repetition units, cell specific pseudo random hopping is applied.

On the co-existence of NPRACH and NPUSCH, Tables 6 to 12 show examples on how NPRACH and NPUSCH (re-using the Multi-tones made available for FDD) can co-exist in all the LTE TDD configurations without having un-used resources. Note from the Tables that the NPRACH transmissions in TDD are as described in this invention compliant with Rel-13 NB-IoT FDD subcarrier spacing (3.75 KHz), and that depending on TDD configuration a different NPRACH format is used to match the available resources in uplink.

TDD Configuration #0

TABLE 6

NPRACH and NPUSCH co-existence over TDD configuration #0 with legacy subcarrier allocations (i.e., 3, and 6 subcarriers)

| TDD | Frame #0 | | | | | | | | | |
|---|---|---|---|---|---|---|---|---|---|---|
| configuration # | 0 | 1 | 2 | 3 | 4 | 5 | 6 | 7 | 8 | 9 |
| 0 | D | S | 1st | | 2nd | D | S | 3rd | | 4th |
| | | | a | a | a | | | a | d | d |
| | | | b | b | b | | | b | | |
| | | | c | c | c | | | c | e | e |

Key:

$1^{st}$ $2^{nd}$ $3^{rd}$ $4^{th}$: Format 2: NPRACH preamble repetition unit (45 KHz) consists of 4 symbol groups a b c e: 3 subcarriers (45 KHz) over 4 ms d: 6 subcarriers (90 KHz) over 2 ms TDD Configuration #1

TABLE 7

NPRACH and NPUSCH co-existence over TDD configuration #1 with legacy subcarrier allocations (i.e., 3, and 6 subcarriers)

| TDD | Frame #0 | | | | | | | | | |
|---|---|---|---|---|---|---|---|---|---|---|
| configuration # | 0 | 1 | 2 | 3 | 4 | 5 | 6 | 7 | 8 | 9 |
| 1 | D | S | 1st | 2nd | D | D | S | 3rd | 4th | D |
| | | | a | a | | | | b | b | |
| | | | c | c | | | | c | c | |

Key:

$1^{st}$ $2^{nd}$ $3^{rd}$ $4^{th}$: Format 1: NPRACH preamble repetition unit (45 KHz) consists of 4 symbol groups a b: 6 subcarriers (90 KHz) over 2 ms c d: 3 subcarriers (45 KHz) over 4 ms TDD Configuration #2

TABLE 8

NPRACH and NPUSCH co-existence over TDD configuration #2 with legacy subcarrier allocations (i.e., 3, and 6 subcarriers)

| TDD | Frame #0 | | | | | | | | | |
|---|---|---|---|---|---|---|---|---|---|---|
| configuration # | 0 | 1 | 2 | 3 | 4 | 5 | 6 | 7 | 8 | 9 |
| 2 | D | S | 1 | D | D | D | S | 3 | D | D |
| | | | 2 | | | | | 4 | | |
| | | | a | | | | | a | | |
| | | | b | | | | | b | | |

Key:

$1^{st}$ $2^{nd}$ $3^{rd}$ $4^{th}$: Format 0: NPRACH preamble repetition unit (45 KHz) consists of 4 symbol groups a: 6 subcarriers (90 KHz) over 2 ms b: 3 subcarriers (45 KHz) over 4 ms

TABLE 9

NPRACH and NPUSCH co-existence over TDD configuration #3 with legacy subcarrier allocations (i.e., 3, and 6 subcarriers) TDD Configuration #3

| TDD config- | Frame #0 | | | | | | | | | | Frame #1 | | | | | | | | | |
|---|---|---|---|---|---|---|---|---|---|---|---|---|---|---|---|---|---|---|---|---|
| uration # | 0 | 1 | 2 | 3 | 4 | 5 | 6 | 7 | 8 | 9 | 0 | 1 | 2 | 3 | 4 | 5 | 6 | 7 | 8 | 9 |
| 3 | D | S | 1st<br>a<br>b<br>c | a<br>b<br>c | 2nd<br>a<br>b<br>c | D | D | D | D | D | D | S | 3rd<br>a<br>b<br>c | 4th<br>d<br>e | d<br>e | D | D | D | D | D |

Key:

$1^{st}$ $2^{nd}$ $3^{rd}$ $4^{th}$: Format 2: NPRACH preamble repetition unit (45 KHz) consists of 4 symbol groups a b c e: 3 subcarriers (45 KHz) over 4 ms d: 6 subcarriers (90 KHz) over 2 ms TDD Configuration #4

TABLE 10

NPRACH and NPUSCH co-existence over TDD configuration #4 with legacy subcarrier allocations (i.e., 3, and 6 subcarriers)

| TDD | Frame #0 | | | | | | | | | | Frame #1 | | | | | | | | | |
|---|---|---|---|---|---|---|---|---|---|---|---|---|---|---|---|---|---|---|---|---|
| configuration # | 0 | 1 | 2 | 3 | 4 | 5 | 6 | 7 | 8 | 9 | 0 | 1 | 2 | 3 | 4 | 5 | 6 | 7 | 8 | 9 |
| 4 | D | S | 1<br>a<br>c | 2<br>a<br>c | D | D | D | D | D | D | D | S | 3<br>b<br>c | 4<br>b<br>c | D | D | D | D | D | D |

Key:

1 2 3 4: Format 1: NPRACH preamble repetition unit (45 KHz) consists of 4 symbol groups a b: 6 subcarriers (90 KHz) over 2 ms d: 3 subcarriers (45 KHz) over 4 ms TDD Configuration #5

TABLE 11

NPRACH and NPUSCH co-existence over TDD configuration #5 with legacy subcarrier allocations (i.e., 3, and 6 subcarriers)

| TDD | Frame #0 | | | | | | | | | | Frame #1 | | | | | | | | | |
|---|---|---|---|---|---|---|---|---|---|---|---|---|---|---|---|---|---|---|---|---|
| configuration # | 0 | 1 | 2 | 3 | 4 | 5 | 6 | 7 | 8 | 9 | 0 | 1 | 2 | 3 | 4 | 5 | 6 | 7 | 8 | 9 |
| 5 | D | S | 1<br>2<br>a<br>b | D | D | D | D | D | D | D | D | S | 3<br>4<br>a<br>b | D | D | D | D | D | D | D |

Key:

1 2 3 4: Format 0: NPRACH preamble repetition unit (45 KHz) consists of 4 symbol groups a: 6 subcarriers (90 KHz) over 2 ms b: 3 subcarriers (45 KHz) over 4 ms TDD Configuration #6

TABLE 12

NPRACH and NPUSCH co-existence over TDD configuration #6 with legacy subcarrier allocations (i.e., 3, and 6 subcarriers)

| TDD | Frame #0 | | | | | | | | | |
|---|---|---|---|---|---|---|---|---|---|---|
| configuration # | 0 | 1 | 2 | 3 | 4 | 5 | 6 | 7 | 8 | 9 |
| 6 | D | S | 1st<br>a<br>b<br>c | <br>a<br>b<br>c | 2nd<br>a<br>b<br>c | D | S | 3rd<br>a<br>b<br>c | 4th<br>d<br>d<br>e | D |

Key:

1 2 3 4: Format 2: NPRACH preamble repetition unit (45 KHz) consists of 4 symbol groups a b c e: 3 subcarriers (45 KHz) over 4 ms d: 6 subcarriers (90 KHz) over 2 ms From Tables 6-12 it can be observed that when NPRACH and NPUSCH are being transmitted simultaneously, Multi-tone NB-IoT transmissions consisting of 3 allocated subcarriers, or a combination of both 3 and 6 allocated subcarriers, can be used over all the LTE TDD configurations for performing resource mappings that do not end up with unused resources.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a wireless device, of transmitting a Random Access (RA) preamble in Time Division Duplex (TDD), from the wireless device to a base station, the method comprising:

selecting a RA preamble format, from among a predetermined set of RA preamble formats, each RA preamble format of the predetermined set specifying a predetermined, even number P of symbol groups composing a RA preamble, wherein each symbol group comprises a Cyclic Prefix (CP) and a number X of symbols, wherein each RA preamble format of the predetermined set is mapped onto a number of adjacent subframes in a predetermined Long Term Evolution (LTE) TDD configuration;

wherein the P symbol groups are divided into symbol group sets fitting into 1, or 2, or 3 contiguous uplink subframes, each symbol group set comprising a number G of 2 or 3 symbol groups transmitted contiguously in time;

wherein at least two symbol group sets are transmitted non-contiguously in time across a number of uplink subframes over which the RA preamble is transmitted;

wherein the predetermined set of RA preamble formats includes:

Format 0 wherein G=2, P=4, and X=1, and the G=2 symbol group sets fit into 1 uplink subframe;

Format 1 wherein G=2, P=4, and X=2, and the G=2 symbol group sets fit into 2 contiguous uplink subframes; and Format 2 wherein G=2, P=4, and X=4, and the G=2 symbol group sets fit into 3 contiguous uplink subframes.

2. The method of claim 1 wherein the symbol groups within a symbol group set are transmitted on adjacent uplink subframes.

3. The method of claim 1 wherein a second symbol group set is transmitted with a cell-specific pseudo-random frequency hop from a first symbol group set.

4. The method of claim 1 further comprising transmitting a RA preamble, based on the selected RA preamble format, a predetermined number $N_{rep}^{NPRACH}$ of times.

5. A wireless device configured to transmit a Random Access (RA) preamble in Time Division Duplex (TDD) to a base station in a wireless communication network, comprising:

a transceiver;

processing circuitry operatively connected to the transceiver, and configured to select a RA preamble format, from among a predetermined set of RA preamble formats, each RA preamble format of the predetermined set specifying a predetermined, even number P of symbol groups composing a RA preamble, wherein each symbol group comprises a Cyclic Prefix (CP) and a number X of symbols, wherein each RA preamble format of the predetermined set is mapped onto a number of adjacent subframes in a predetermined Long Term Evolution (LTE) TDD configuration;

wherein the P symbol groups are divided into symbol group sets fitting into 1, or 2, or 3 contiguous uplink subframes, each symbol group set comprising a number G of 2 or 3 symbol groups transmitted contiguously in time;

wherein at least two symbol group sets are transmitted non-contiguously in time across a number of uplink subframes over which the RA preamble is transmitted;

wherein the predetermined set of RA preamble formats includes:

Format 0 wherein G=2, P=4, and X=1, and the G=2 symbol group sets fit into 1 uplink subframe;

Format 1 wherein G=2, P=4, and X=2, and the G=2 symbol group sets fit into 2 contiguous uplink subframes; and Format 2 wherein G=2, P=4, and X=4, and the G=2 symbol group sets fit into 3 contiguous uplink subframs.

6. The wireless device of claim 5 wherein the symbol groups within a symbol group set are transmitted on adjacent uplink subframes.

7. The wireless device of claim 5 wherein a second symbol group set is transmitted with a cell-specific pseudo-random frequency hop from a first symbol group set.

8. The wireless device of claim 5 further comprising transmitting a RA preamble, based on the selected RA preamble format, a predetermined number $N_{rep}^{NPRACH}$ of times.

9. A method, performed by a base station operative in a wireless communication network, of receiving a Random Access (RA) preamble in Time Division Duplex (TDD), from a wireless device, the method comprising:

receiving a RA preamble format, from among a predetermined set of RA preamble formats, each RA preamble format of the predetermined set specifying a predetermined, even number P of symbol groups composing a RA preamble, wherein each symbol group comprises a Cyclic Prefix (CP) and a number X of symbols, wherein each RA preamble format of the predetermined set is mapped onto a number of adjacent subframes in a predetermined Long Term Evolution (LTE) TDD configuration;

wherein the P symbol groups are divided into symbol group sets fitting into 1, or 2, or 3 contiguous uplink subframes, each symbol group set comprising a number G of 2 or 3 symbol groups transmitted contiguously in time;

wherein at least two symbol group sets are transmitted non-contiguously in time across a number of uplink subframes over which the RA preamble is transmitted;

wherein the predetermined set of RA preamble formats includes:

Format 0 wherein G=2, P=4, and X=1, and the G=2 symbol group sets fit into 1 uplink subframe;

Format 1 wherein G=2, P=4, and X=2, and the G=2 symbol group sets fit into 2 contiguous uplink subframes; and Format 2 wherein G=2, P=4, and X=4, and the G=2 symbol group sets fit into 2 contiguous uplink subframes.

10. The method of claim 9 wherein the symbol groups within a symbol group set are transmitted on adjacent uplink subframes.

11. The method of claim 9 wherein a second symbol group set is transmitted with a cell-specific pseudo-random frequency hop from a first symbol group set.

12. The method of claim 9 further comprising receiving a RA preamble, based on the selected RA preamble format, a predetermined number $N_{rep}^{NPRACH}$ of times.

13. A base station operative in a wireless communication network and configured to receive a Random Access (RA) preamble in Time Division Duplex (TDD) from a wireless device, comprising:

a transceiver;

processing circuitry operatively connected to the transceiver, and configured to receive a RA preamble format, from among a predetermined set of RA preamble formats, each RA preamble format of the predetermined set specifying a predetermined, even number P of symbol groups composing a RA preamble, wherein each symbol group comprises a Cyclic Prefix (CP) and a number X of symbols, wherein each RA preamble format of the predetermined set is mapped onto a number of adjacent subframes in a predetermined Long Term Evolution (LTE) TDD configuration;

wherein the P symbol groups are divided into symbol group sets fitting into 1, or 2, or 3 contiguous uplink subframes, each symbol group set comprising a number G of 2 or 3 symbol groups transmitted contiguously in time;

wherein at least two symbol group sets are transmitted non-contiguously in time across a number of uplink subframes over which the RA preamble is transmitted;

wherein the predetermined set of RA preamble formats includes:

Format 0 wherein G=2, P=4, and X=1, and the G=2 symbol group sets fit into 1 uplink subframe;

Format 1 wherein G=2, P=4, and X=2, and the G=2 symbol group sets fit into 2 contiguous uplink subframes; and Format 2 wherein G=2, P=4, and X=4, and the G=2 symbol group sets fit into 3 contiguous uplink subframes.

14. The base station of claim 13 wherein the symbol groups within a symbol group set are transmitted on adjacent uplink subframes.

15. The base station of claim 13 wherein a second symbol group set is transmitted with a cell-specific pseudo-random frequency hop from a first symbol group set.

16. The base station of claim 13 further comprising receiving a RA preamble, based on the selected RA preamble format, a predetermined number $N_{rep}^{NPRACH}$ of times.

* * * * *

UNITED STATES PATENT AND TRADEMARK OFFICE

CERTIFICATE OF CORRECTION

PATENT NO. : 11,357,055 B2
APPLICATION NO. : 16/651385
DATED : June 7, 2022
INVENTOR(S) : Lin et al.

It is certified that error appears in the above-identified patent and that said Letters Patent is hereby corrected as shown below:

In the Specification

In Columns 17 & 18, in Table 9, Line 3, delete "TDD Configuration #3" and insert the same at Line 1, before "TABLE 9", as a new sub-heading.

In the Claims

In Column 21, Lines 33-34, in Claim 5, delete "subframs." and insert -- subframes. --, therefor.

In Column 22, Line 10, in Claim 9, delete "into 2" and insert -- into 3 --, therefor.

Signed and Sealed this
Fourteenth Day of February, 2023

Katherine Kelly Vidal

Katherine Kelly Vidal
*Director of the United States Patent and Trademark Office*